(12) United States Patent
Lu et al.

(10) Patent No.: US 8,207,078 B2
(45) Date of Patent: Jun. 26, 2012

(54) CLOSE COUPLED CATALYST FOR PURIFICATION OF EXHAUST GAS AND THE PREPARATION THEREOF

(75) Inventors: Guanzhong Lu, Shanghai (CN); Yun Guo, Shanghai (CN); Zhigang Zhang, Shanghai (CN)

(73) Assignee: East China University of Science and Technology, Shanghai (CN)

( * ) Notice: Subject to any disclaimer, the term of this patent is extended or adjusted under 35 U.S.C. 154(b) by 307 days.

(21) Appl. No.: 12/521,866

(22) PCT Filed: Feb. 14, 2007

(86) PCT No.: PCT/CN2007/000518
§ 371 (c)(1),
(2), (4) Date: Jun. 30, 2009

(87) PCT Pub. No.: WO2008/086662
PCT Pub. Date: Jul. 24, 2008

(65) Prior Publication Data
US 2010/0048383 A1    Feb. 25, 2010

(30) Foreign Application Priority Data
Jan. 4, 2007  (CN) .......................... 2007 1 0036205

(51) Int. Cl.
*B01J 29/06*    (2006.01)

(52) U.S. Cl. ................ 502/60; 502/63; 502/64; 502/65; 502/73; 502/74; 502/302; 502/303; 502/304; 502/527.19

(58) Field of Classification Search .................... 502/60, 502/63, 64, 65, 73, 74, 302, 303, 304, 527.19
See application file for complete search history.

(56) References Cited

U.S. PATENT DOCUMENTS

| | | |
|---|---|---|
| 5,075,276 A | 12/1991 | Ozawa et al. |
| 6,589,901 B2 | 7/2003 | Yamamoto et al. |
| 2004/0183758 A1 | 9/2004 | Chen et al. |
| 2005/0017934 A1 | 1/2005 | Chung et al. |
| 2005/0052377 A1 | 3/2005 | Hsueh |

FOREIGN PATENT DOCUMENTS

| | | |
|---|---|---|
| CN | 1680020 A | 10/2005 |
| CN | 1768934 | 5/2006 |

*Primary Examiner* — Elizabeth Wood

(57) ABSTRACT

A close coupled three-way catalyst for purification of exhaust gas of motor vehicle and the preparation thereof. The support is selected from cordierite honeycomb ceramic materials having a pore volume of 0.25-0.35 ml/g. The coating layer is the mixture of hexaaluminate and perovskite-type composite oxide, cerium-zirconium solid solution, rare-earth oxide and alumina, alkali-earth oxide and zeolite having a high Si/Al ratio. The active components are palladium-rhodium, rare-earth oxide and transition metal in the hexaaluminate and perovskite-type composite oxide. The catalyst has not only the function of low-temperature catalytic oxidation of hydrocarbons, but also the function of reduction of nitrogen oxides, and can be used for purifying the exhaust gas of motor vehicles using gasoline, liquid gas, or CNG as fuel.

8 Claims, No Drawings

CLOSE COUPLED CATALYST FOR PURIFICATION OF EXHAUST GAS AND THE PREPARATION THEREOF

CROSS-REFERENCE TO RELATED PATENT APPLICATIONS

This application claims the priority benefit of PCT/CN2007/000518, filed on Feb. 14, 2007, which claims the priority benefit of Chinese Patent Application No. 200710036205.5, filed on Jan. 14, 2007 and is now abandoned. The respective disclosures of the foregoing applications are incorporated herein by reference in their entirety.

FIELD OF THE INVENTION

The present invention relates to a catalyst field, and more particularly to a close coupled catalyst for purifying exhaust gas of motor vehicle and reducing emission of hydrocarbons, and the preparation thereof.

BACKGROUND OF THE INVENTION

Primary pollutant in exhaust gas of motor vehicle is incompletely burned hydrocarbons (HC), carbon monoxide (CO) and nitrogen oxide ($NO_x$), wherein more than two thirds hydrocarbons are exhausted out during the cold-start phase of motor vehicle. In the cold-start phase, especially within about 100 seconds after the first start of an engine, the temperature of a vehicle exhaust catalytic converter still doesn't come to the optimal working temperature and can not provide a good purification effect, so that it is important to reduce the emission of hydrocarbons during the cold-start phase of motor vehicle, in order to control the atmosphere pollution.

Two methods can be used to treat the emission of hydrocarbons during the cold-start phase of motor vehicle, wherein one method is to increase the temperature of the catalytic converter for speeding the activation of catalyst mainly by means of delay of sparking, thermal insulation of exhaust-pipe, electrically heating of catalytic converter, combustion heating of catalytic converter and etc.; and the other method is to install a hydrocarbon absorber prior to the catalytic converter for absorbing hydrocarbons when the temperature of the exhaust system is relatively low, in order to reduce the emission of hydrocarbons. When the temperature of the system raises, the absorbed hydrocarbons may desorb and enter the catalytic converter to be oxidized. However, the foregoing technology is too complicated, and will correspondingly increase the cost. Therefore, it becomes a research hotspot to install a close coupled catalyst having a position close to an exhaust outlet of an engine for being widely applied to the field of controlling exhaust gas of motor vehicle.

The close coupled catalyst is generally used with a chassis three-way catalyst. As the close coupled catalyst is closer to the exhaust outlet of the engine, it is also called an upstream catalyst, a pre-catalyst. Because the temperature of the cold-start phase is lower, the close coupled catalyst must have the higher low-temperature activation. However, after the engine keeps stably working, the close coupled catalyst will directly expose under high-temperature exhaust gas (more than 1000° C.), so that the close coupled catalyst must simultaneously have a higher high-temperature stability to undergo the temperature exhaust of 1100° C. or more than 1100° C.

U.S. Patent Publication No. 2001/0036432 discloses a close coupled catalyst prepared by using palladium nitrate, γ-$Al_2O_3$ having a surface area of about 160 $m^2/g$, zirconium acetate, lanthanum nitrate, zirconium nitrate, neodymium nitrate, barium nitrate, strontium nitrate and cordierite, wherein the catalyst includes 100 $g/ft^3$ of Pd, 1.23 $g/in^3$ of $Al_2O_3$, 0.19 $g/in^3$ of $La_2O_3$, 0.1 $g/in^3$ of $ZrO_2$, 0.1 $g/in^3$ of SrO, and 0.16 $g/in^3$ of $Nd_2O_3$.

Chinese Patent Application No. 200610020144.9 discloses a close coupled catalyst which comprises at least three kinds of alumina with different crystal phases as a catalyst carrier, wherein Pd is used as an active component; at least one of rare-earth oxides including $La_2O_3$, $Nd_2O_3$, $Y_2O_3$, and $Sm_2O_3$, at least one of alkaline earth oxides including SrO, BaO and CaO, and $ZrO_2$ are used. Hydrocarbon light-off temperature is below 250° C. over the catalyst aged at 1050° C. in the wet air.

U.S. Pat. No. 6,254,842 discloses a close coupled catalyst which is aged in 10% steam-air at 950° C. for 12 hours. Using this catalyst, the conversion temperature for HC, CO and $NO_x$ is 252° C., 228° C. and 213° C., respectively.

U.S. Pat. No. 6,602,822 discloses that the light-off temperature of a close coupled catalyst for the purification of hydrocarbon can be lowered by suitably lowering the thickness of the coating. U.S. Pat. No. 5,878,567 discloses a closed coupled catalyst prepared by highly loaded palladium or tri-metal catalytic elements.

Although the foregoing technologies can low the exhaust gas during the cold-start phase, the cost of treating the exhaust gas of motor vehicle will be increased. U.S. Pat. No. 6,254,842 discloses that the closed coupled catalyst can provide the function of three-way catalyst, so as to partially replace the three-way catalyst for lowering the cost.

In order to enhance the performance of the close coupled catalyst, the preparation method of the catalyst and the structure design thereof are substantially researched, and a close coupled catalyst having dual layer structures is developed.

Chinese Patent No. 1197686A discloses a preparation of catalyst for exhaust gas purification and with high activity for the hydrocarbon conversion, wherein the catalyst consists of platinum metals as catalytically active components and two functional coatings stacked on a carrier. A first functional coating comprises a mixture of a first catalyst component and at least one type of zeolite, and the second functional coating comprises a mixture of a second catalyst component and at least one type of zeolite. The platinum metal is at least palladium and rhodium which are separately from each other and contained in each of the two catalysts.

U.S. Pat. No. 5,057,483 discloses a three-way catalyst located inside an internal combustion engine, wherein the catalyst has two coatings. A first coating includes alumina, platinum and cerium oxide, and iron oxide and nickel oxide can be added for the suppression of hydrogen sulfide emissions. Further, baria and zirconia can be added to enhance the stability of the first coating. The second coating is disposed on the first coating, and includes rare earth oxide-zirconia, rhodium, alumina and a noble metal except for rhodium.

U.S. Pat. No. 6,875,725 discloses a closed coupled catalyst which is also a dual-layer catalyst, wherein a first coating includes aluminum oxide, barium oxide and palladium, and a second coating includes aluminum oxide with 3 wt % lanthanum oxide, γ-aluminum oxide, praseodymium oxide, cerium/zirconium mixed oxides, palladium, and rhodium.

U.S. Patent Publication No. 2003/0039597 invents a closed coupled catalyst for the removal of pollutants during the cold-start phase of motor vehicle. The catalyst has two sections, wherein an upstream section includes one platinum-group element and a $SO_x$ sorbent (selected from the group consisting of oxides and mixed oxides of barium, lanthanum, magnesium, manganese, neodymium, praseodymium, and strontium), while a downstream section comprises another platinum-group element and a $NO_x$ sorbent having $NO_x$ absorption function.

As described above, it is an object for researchers to develop a closed coupled catalyst having better high-temperature stability, higher activity and lower selling price.

SUMMARY OF THE INVENTION

An object of the present invention is to solve the shortcoming of the traditional technologies, so as to provide a close coupled catalyst with higher activity and higher stability and the preparation thereof for satisfying requirement of complying with Euro III Emission Standard and higher Emission Standard than Euro III about exhaust gas of motor vehicle.

The present invention uses highly stable molecular sieve having a high Si/Al ratio to absorb hydrocarbons at low temperature, so as to lower the emission of hydrocarbons. Meanwhile, by designing the composition of the catalyst, the three-way purification performance of the close coupled catalyst can be enhanced, and the loading amount of primary three-way catalyst can be reduced, so as to partially replace the primary three-way catalyst for lowering the entire cost.

The present invention provides a close coupled catalyst for purification of exhaust gas of motor vehicle and a preparation method for this catalyst, wherein the close coupled catalyst is a three-way catalyst consisted of the monolith carrier, a washcoating deposited on the monolith carrier, and a catalyst active components supported on the coating. The principle is that multiform composite oxide material with highly thermal stability were mixed to prepare the rare-earth oxide washcoating with high surface area and highly thermal stability by solid-state chemical reaction, and then the catalyst components of (rare-earth)-(non-noble metal)-(trace noble metal) are designed to lower the usage amount of noble metal.

The carrier is selected from cordierite honeycomb ceramic material having a pore volume of 0.25-0.35 ml/g and a pore density of 400-600 cpsi or honeycomb metal substrate.

The washcoating is a mixture of hexaaluminate and perovskite-type composite oxide, cerium-zirconium solid solution, rare-earth oxide and alumina, alkali-earth oxide and molecular sieve (i.e. zeolite) having a high Si/Al ratio.

The cerium-zirconium solid solution is solid mixture of ceria and zirconia.

The rare-earth element is preferably selected from lanthanum, cerium or praseodymium.

The perovskite-type composite oxide is La—Co(Mn)—Fe—O system.

The hexaaluminate is La(Ce)—Co(Mn)—Fe—Al—O system, wherein the particle diameter of powders of the mixture of hexaaluminate and perovskite-type composite oxide is smaller than 5 μm.

The alkali-earth oxide is one and/or more than one of calcium (Ca) oxide, strontium (Sr) oxide, and barium (Ba) oxide.

The molecular sieve having the high Si/Al ratio is β-molecular sieve or MCM-22 molecular sieve (i.e. the molecular sieve is selected from the group consisting of MCM-22 and beta zeolite), and the Si/Al ratio thereof is greater than 80.

The catalyst active components are a mixture of noble metal and non-noble metal oxide, wherein the noble metal is palladium, rhodium and etc., and the non-noble metal oxide is manganese oxide, cobalt oxide, iron oxide, cerium oxide and etc.

In the technical solution of the present invention, the weight ratio of cerium/zirconium in the cerium-zirconium solid solution is 7:3-3:7, wherein the cerium-zirconium solid solution further comprises one or more than one oxide having a weight ratio of 0.002:1-0.03:1 of the total weight of cerium-zirconium solid solution, and the oxide is selected from rare-earth oxide, alkali-earth metal oxide, alumina or silica, wherein it is preferably selected from a cerium-zirconium solid solution having a cerium/zirconium ratio of 4:6-6:4, other oxide is preferably selected from barium oxide and silica, and the rare-earth oxide is preferably selected from lanthanum oxide.

The weight of the washcoating is 15-25 wt % of the weight of the carrier. In the washcoating, the weight ratio of hexaaluminate and perovskite-type composite oxide/cerium-zirconium solid solution/rare-earth oxide/alumina/molecular sieve is 4-10/1/0.1-0.5/1-2/2-6, and the alkali-earth metal oxide is 0.1-5 wt % of the total weight of the washcoating, wherein the weight ratio of hexaaluminate/perovskite-type composite oxide is 1-10.

In the catalyst active components, the weight of the noble metal and the non-noble metal oxide is 0.5-15 wt % of the weight of the washcoating of the catalyst; the weight ratio of palladium/rhodium is 10/0.3-2; the content of palladium in the catalyst is 1.8-3 g/L of the catalyst; manganese oxide, cobalt oxide and iron oxide are present in hexaaluminate and perovskite-type composite oxide, and are 5-20 wt % of the total weight of the washcoating; and the content of cerium oxide is 1-10 wt % of the total weight of the washcoating.

The present invention provides a method for preparing a close coupled catalyst for purification of exhaust gas of motor vehicle, which comprises the following steps of:

(1) Immersing a cordierite honeycomb ceramic carrier into an aqueous slurry having 50-30 wt % of coating solids for 5-15 minutes, and then drying followed by calcining for 3-6 hours at 400-600° C. The aqueous slurry is the mixture of hexaaluminate and perovskite-type composite oxide, cerium-zirconium solid solution, rare-earth oxide and alumina, alkali-earth oxide and molecular sieve having a high Si/Al ratio, thickener and water.

The weight of the thickener is 0.5-5 wt % of the weight of the aqueous slurry, and the thickener is nitric acid.

(2) Immersing the cordierite honeycomb ceramic carrier having the washcoating prepared by step (1) into an aqueous solution of palladium salt, rhodium salt and cerium salt having a weight concentration of 0.5-6 wt % for 5-10 minutes by means of equivalent volume impregnation method, and then drying followed by calcining for 3-6 hours at 500-800° C., and reducing by hydrogen, so as to obtain the catalyst.

When loading the catalyst active components, weighted precursor salts of palladium and rhodium of the catalyst active components also can be solved into the aqueous slurry of washcoating, and then be applied to the cordierite honeycomb carrier together with the aqueous slurry. Alternatively, an aqueous solution of weighted precursor salts of palladium and rhodium of the catalyst active components also can be used to impregnate alumina and molecular sieve having a high Si/Al ratio (such as β-molecular sieve or MCM-22 molecular sieve) by means of equivalent volume impregnation method, and then be dried and added into the aqueous slurry of washcoating followed by being applied on the cordierite honeycomb carrier with the slurry.

In the aqueous solution of palladium salt, rhodium salt and cerium salt, the weight ratio of palladium salt/rhodium salt/cerium salt is 3-8/1-3/15-30.

The palladium salt is palladium chloride or palladium nitride, the rhodium salt is rhodium chloride or rhodium nitride, and the cerium salt is cerium nitride.

According to the present invention, the cordierite honeycomb ceramic carrier is immersed in the aqueous slurry of the coating for 5-10 minutes, preferably under vacuum condition.

Alternatively,

The process of the step (1) can be separated into two steps: a first step is to immerse the cordierite honeycomb ceramic carrier into an aqueous slurry (I) having 50-30 wt % of coating solids for 5-15 minutes, and then dry. The aqueous slurry (I) is the mixture of hexaaluminate and perovskite-type composite oxide, cerium-zirconium solid solution, rare-earth oxide and alumina, alkali-earth oxide, thickener and water. A second step is to immerse the cordierite honeycomb ceramic carrier applied with the coating (I) into an aqueous slurry (II) having 50-30 wt % of coating solids for 5-15 minutes, and then dry followed by calcining for 3-6 hours at 400-600° C. The aqueous slurry (II) is the mixture of alumina, molecular sieve having a high Si/Al ratio, thickener and water. Alumina is one portion of the washcoating material, i.e. an adhesive of the molecular sieve, wherein the weight ratio of alumina/molecular sieve is 0.2-0.5.

The catalyst prepared by the foregoing method not only has a low-temperature catalytic oxidation function of hydrocarbons, but also has a reduction function of nitrogen oxides, so as to be used as a close coupled catalyst of a three-way catalyst for purifying exhaust gas of motor vehicle using gasoline, liquefied petroleum gas (LPG), or compressed natural gas (CNG) as fuel.

DETAILED DESCRIPTION OF THE PREFERRED EMBODIMENTS

Eight embodiments are provided, as follows:

Embodiment 1

Placing 4.8 g of cordierite honeycomb ceramic carrier (pore volume: 0.3 ml/g; pore density: 400 cpsi; and volume: 10 ml) into a 110° C. drying container. Weighting 20 g of hexaaluminate oxide (containing 6 g of perovskite-type composite oxide), 4 g of cerium-zirconium solid solution powder, 6 g of $\gamma$-$Al_2O_3$ (containing 2% of Si), 0.3 g of lanthanum nitrate, log of MCM-22 molecular sieve and 1 of SrO, and mixing them with each other, followed by adding 150 ml of de-ionized water. Stirring at ambient temperature, while adjusting the pH value to 4 by nitric acid, so as to obtain the aqueous slurry of washcoating.

Then, immersing the carrier into the aqueous slurry for 5 minutes in a vacuum container. Taking out the carrier, and sweeping by air. Further, drying at 110° C. for 10 hours, and then calcining at 400° C. for 3 hours.

Weighting 3.4 g of $PdCl_2$, 0.41 g of $RhCl_3$ and 38 g of $Ce(NO_3)_3 \cdot 6H_2O$, and adding 300 ml of de-ionized water to obtain a solution of precursor salts of the catalyst active components. Impregnating the solution containing the catalyst active components on the carrier having the washcoating by equivalent volume impregnation method. After drying at 110° C. for 10 hours and calcining at 600° C. for 3 hours, pre-treating by $H_2$ at 250° C. for 2 hours, so as to obtain Catalyst 1 of the present invention containing 2 g/L of Pd, 0.2 g/L of Rh, and 15 g/L of $CeO_2$.

Embodiment 2

The preparation method is the same as Embodiment 1, but the difference therebetween is that lanthanum nitrate is replaced by praseodymium nitrate, and strontium nitrate is replaced by barium nitrate, wherein the content of Pd is 3 g/L, so as to obtain Catalyst 2 of the present invention.

Embodiment 3

The preparation method is the same as Embodiment 1, but the difference therebetween is that MCM-22 molecular sieve is replaced by $\beta$-molecular sieve, so as to obtain Catalyst 3 of the present invention.

Embodiment 4

Adding weighted precursor salts of Pd and Rh of the catalyst active components into the washcoating slurry of Embodiment 1, and applying on cordierite honeycomb ceramic carrier with the coating slurry, wherein the other processes are the same as Embodiment 1. Then, weighting 38 g of $Ce(NO_3)_3 \cdot 6H_2O$, and adding 300 ml of de-ionized water to obtain a solution of precursor salt of the catalyst active components. Impregnating the solution of the catalyst active components on the carrier having the washcoating by an equivalent volume impregnation method. After drying at 110° C. for 10 hours and calcining at 600° C. for 3 hours, pre-treating the carrier by $H_2$ at 250° C. for 2 hours, so as to obtain Catalyst 4 of the present invention containing 2 g/L of Pd, 0.2 g/L of Rh, and 15 g/L of $CeO_2$.

Embodiment 5

Impregnating the solution of weighted precursor salts of Pd and Rh of the catalyst active components on alumina and $\beta$-molecular sieve of Embodiment 3 by an equivalent volume impregnation method, and drying followed by adding into the washcoating slurry. Then, applying this washcoating slurry containing catalyst active components on cordierite honeycomb ceramic carrier, wherein the other processes are the same as Embodiment 4, so as to obtain Catalyst 5 of the present invention.

Embodiment 6

The preparation method is the same as Embodiment 1, but the difference therebetween is that 10 g of MCM-22 molecular sieve is replaced by 10 g of silicon-modified alumina, so as to obtain Catalyst 6 of the present invention.

Embodiment 7

The preparation method is the same as Embodiment 1, but the difference therebetween is that 20 g of hexaaluminate oxide (containing 6 g of perovskite-type composite oxide) and log of MCM-22 molecular sieve are replaced by 30 g of $\gamma$-$Al_2O_3$, so as to obtain Catalyst 7 of the present invention.

Embodiment 8

The preparation method is the same as Embodiment 7, but the difference therebetween is that the content of Pd is lowered from 2 g/L to 1.2 g/L, so as to obtain Catalyst 8 of the present invention.

The aging treatment of the catalyst: placing the prepared fresh catalyst into a tubular oven, and introducing air containing 10% of $H_2O$ into the tubular oven for aging at 950° C. for 30 hours.

Testing the performances of the catalysts is carried out on a stainless steel fixed-bed reactor. Simulating the exhaust gas of motor vehicle, which contains CO with a concentration of 1.5%, HC with a concentration of 1000 ppm (each of $C_3H_6$ and $C_3H_8$ occupies a half content), NO with a concentration of 600 ppm, $O_2$ gas with a concentration of 0-5%, and balanced $N_2$ gas, wherein the gas hourly space velocity (GHSV) is 40000 h-1, and the gas composition is analyzed by the five gas exhaust analyzer for the exhaust gas of motor vehicle.

Although the catalyst of the present invention has an excellent three-way purification performance, it still must consider that the purpose of the close coupled catalyst is used to lower the high emission concentration of hydrocarbons during the cold-start phase of motor vehicle. Thus, in the present invention we mainly measure the light-off temperature ($T_{50}$%) of hydrocarbons over the catalyst after being aged and its adsorption property for hydrocarbons at low temperature.

To conveniently compare, in the present invention after the simulated exhaust gas of motor vehicle passing through the catalyst for 20 seconds at 25° C., the $C_3$ concentration in outlet is detected as comparison data. Before being measured, the catalyst is first treated with the simulated exhaust gas at 660° C. for 2 hours.

The result of simulation test is listed as follows:

|  | Catalyst No. | $T_{50\%}$ (° C.) | $C_3$ concentration (after 20 sec.) |
| --- | --- | --- | --- |
| Embodiment 1 | 1 | 223 | ~260 ppm |
| Embodiment 2 | 2 | 205 | ~255 ppm |
| Embodiment 3 | 3 | 220 | ~130 ppm |
| Embodiment 4 | 4 | 208 | ~250 ppm |
| Embodiment 5 | 5 | 211 | ~110 ppm |
| Embodiment 6 | 6 | 222 | ~980 ppm |
| Embodiment 7 | 7 | 220 | ~1000 ppm |
| Embodiment 8 | 8 | 300 | ~250 ppm |

The invention claimed is:

1. A close coupled catalyst for purification of exhaust gas of motor vehicle, comprising: a carrier, a washcoating applied on the carrier, and catalyst active components applied on the washcoating, characterized in that:
the carrier is selected from cordierite honeycomb ceramic material;
the washcoating is a mixture of hexaaluminate and perovskite-type composite oxide, cerium-zirconium solid solution, rare-earth oxide and alumina, alkali-earth oxide and molecular sieve having a Si/Al ratio greater than 80, wherein the molecular sieve is selected from the group consisting of MCM-22 and beta zeolite;
the rare-earth element is selected from lanthanum, cerium or praseodymium;
the alkali-earth oxide is one and/or more than one of calcium oxide, strontium oxide, and barium oxide;
the catalyst active components are a mixture of noble metal, non-noble metal oxide and rare-earth oxide, wherein the noble metal is palladium and rhodium, the non-noble metal is manganese, cobalt and iron, and the rare-earth oxide is cerium oxide.

2. The close coupled catalyst according to claim 1, characterized in that: the carrier of cordierite honeycomb ceramic material has a pore volume of 0.25-0.35 ml/g and a pore density of 400-600 cpsi.

3. The close coupled catalyst according to claim 1, characterized in that: the particle diameter of powders of the mixture of hexaaluminate and perovskite-type composite oxide is smaller than 5 μm.

4. The close coupled catalyst according to claim 1, characterized in that: the weight ratio of cerium/zirconium in the cerium-zirconium solid solution is 7:3-3:7.

5. The close coupled catalyst according to claim 1, characterized in that: the cerium-zirconium solid solution comprises one or more than one oxide having a weight ratio of 0.002:1-0.03:1 of the total weight of cerium-zirconium solid solution and selected from rare-earth oxide, alkali-earth metal oxide, alumina or silica.

6. The close coupled catalyst according to claim 4 or 5, characterized in that: the weight ratio of cerium-zirconium solid solution has a cerium/zirconium ratio of 4:6-6:4, and the rare-earth oxide is lanthanum oxide.

7. The close coupled catalyst according to claim 1, characterized in that: the weight of the washcoating is 15-25 wt % of the carrier, and the weight ratio of hexaaluminate and perovskite-type composite oxide/cerium-zirconium solid solution/rare-earth oxide/alumina/molecular sieve in the coating is 4-10/1/0.1-0.5/1-2/2-6, and the alkali-earth metal oxide is 0.1-5 wt % of the total weight of the washcoating, wherein the weight of hexaaluminate/perovskite-type is 1-10.

8. The close coupled catalyst according to claim 1, characterized in that: the weight of the noble metal and the non-noble metal oxide in the catalyst active component is 0.5-15 wt % of the weight of the washcoating of the catalyst; the weight ratio of palladium/rhodium is 10/0.3-2; the content of palladium in the catalyst is 1.8-3 g/L of the catalyst; manganese oxide, cobalt oxide and iron oxide are present in hexaaluminate and perovskite-type composite oxide, and are 5-20 wt % of the total weight of the washcoating; and the content of cerium oxide is 1-10 wt % of the total weight of the washcoating.

* * * * *